US007006782B2

(12) United States Patent
Chen et al.

(10) Patent No.: US 7,006,782 B2
(45) Date of Patent: Feb. 28, 2006

(54) FUSING STATION AND METHOD FOR FUSING

(75) Inventors: Jiann-Hsing Chen, Fairport, NY (US); Joseph A. Pavlisko, Pittsford, NY (US); David F. Cahill, Rochester, NY (US); Charles E. Hewitt, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/887,295

(22) Filed: Jul. 7, 2004

(65) Prior Publication Data

US 2005/0008805 A1     Jan. 13, 2005

Related U.S. Application Data

(60) Provisional application No. 60/486,344, filed on Jul. 11, 2003.

(51) Int. Cl.
    *G03G 15/20*    (2006.01)
(52) U.S. Cl. ..................................... 399/333
(58) Field of Classification Search ............... 399/331, 399/333; 428/36.8, 36.91, 421
    See application file for complete search history.

(56) References Cited

U.S. PATENT DOCUMENTS

| 6,355,352 | B1 | 3/2002 | Chen et al. | 428/421 |
| 6,361,829 | B1 | 3/2002 | Chen et al. | 427/380 |
| 6,372,833 | B1 | 4/2002 | Chen et al. | 524/409 |
| 6,429,249 | B1 | 8/2002 | Chen et al. | 524/432 |
| 6,603,947 | B1 * | 8/2003 | Katayanagi et al. | 399/333 |

* cited by examiner

*Primary Examiner*—Quana Grainger
(74) *Attorney, Agent, or Firm*—Lawrence P. Kessler

(57) ABSTRACT

This invention relates to an improved fusing station for fusing a toner image to a receiver when the fusing station includes a fuser roller having a hardness from about 50 to about 80 Shore A and an outside coating comprising a low damping fluorocarbon thermoplastic random copolymer roller coating formulation having a tan delta from about 0.01 to about 0.15 and containing from about 1.5 to about 2.5 parts per hundred (pph), based upon the weight of the copolymer of a curing agent having a bisphenol residue and a pressure roller having a smaller outer diameter than the fuser roller and positioned in pressure contact with the fuser roller to form a fusing nip between the pressure roller and the fuser roller. A method is also provided for fusing toner images to receiver sheets using the fusing station.

19 Claims, 3 Drawing Sheets

FUSING STATION AND METHOD FOR FUSING

CROSS REFERENCE TO RELATED APPLICATION

Reference is made to and priority claimed from U.S. Provisional Application Ser. No. 60/486,344, filed Jul. 11, 2003, entitled FUSING STATION AND METHOD FOR FUSING.

FIELD OF THE INVENTION

This invention relates to an improved fusing station, including a pressure roller and a fuser roller, for fusing heat softenable toners to a receiver such as paper and the like. The invention further relates to a method for fusing the toner to the receiver. Improved receiver sheet and toner release from the fuser rollers is achieved.

BACKGROUND OF THE INVENTION

In electrophotographic copying, an electrostatic latent image is developed on a primary image-forming member, such as a photoconductive surface, and is developed with a heat softenable thermoplastic toner powder to form a toner image. The toner image is thereafter transferred to a receiver, such as a sheet of paper, plastic or the like, and the toner image is subsequently fused to the receiver in a fusing station using heat, pressure, or both. A fusing station includes fuser members, which are typically rollers such as a pressure roller and a fuser roller, although fuser belts and the like may also be used. The essential function performed in the fusing station is the application of heat and pressure to the toner image on the receiver to fix the image to the receiver. In the discussion of this invention, the terms pressure roller and fuser roller will be used to refer to the two rollers used in the fusing station. It should be understood that reference to rollers also includes a reference to fuser belts and similar equipment that provide similar heat and pressure treatment for latent images on receiver sheets.

The fusing step is commonly carried out by passing the toner image-bearing receiver between a pair of engaged rollers that produce an area of pressure contact at the point of the engagement of the rollers known as a fusing nip. In order to form the nip, at least one of the rollers typically includes a compliant or conformable layer. Heat is transferred from at least one of the rollers to the toner in the fusing nip causing the toner to partially melt and attach to the receiver. In the case where the fuser member is a heated roller, a resilient and compliant pressure roller having a smooth surface is typically used. Where the member is in the form of a belt, such as a flexible and endless belt that passes around the heated roller, the belt typically has a smooth, hardened outer surface.

Most fusing stations, which are known as simplex fusers, attach toner to only one side of the receiver at a time. In such fusers it is common for a first one of the two rollers to be driven rotatably. The second roller is then rotatably driven by frictional contact with the first roller. Similarly, heat is typically applied to only one of the rollers, which roller is generally referred to as a fuser roller. The heat may be applied by the use of one or more heater rollers in contact with the heated roller to heat the exterior of the heated fuser roller or the heat may be applied internally to the heated fuser roller.

Various types of heater rollers have been used. The hardness of the rollers has been varied over wide limits in attempts to achieve better fusing results. Typically fuser rollers and pressure rollers may include a conformable layer that may be formed of any suitable material, such as polydimethylsiloxane elastomer.

Typically, fuser rollers include a hollow cylinder core, which is often metallic, with a roller cushion layer formed around the roller. Such cushion layers are commonly made of silcone rubbers or silcone polymers having a low surface energy such as polydimethylsiloxane, which minimizes adherence of toner to the roller, especially the heated roller. It is also known that cured polyfluorocarbon polymers and copolymers may be used to coat the cushion layer surface to further reduce the tendency of the toner to adhere to the roller and minimize contact of release oils with the cushion layer.

The cushion layer may include fillers including inorganic particles such as metals, metal oxides, metal hydroxides, metal salts, mixtures thereof and the like. The cushion layer may include a siloxane elastomer, such as a condensation cross-linked polydimethylsiloxane, which contains metal oxide fillers. Cushion materials of this type exhibit serious stability problems over time if they come in contact with release oils and the like.

Such materials are described more fully in U.S. Pat. No. 6,361,829 issued Mar. 26, 2002 to Jiann H. Chen, et al. (Chen '829) and assigned on its face to NexPress Solutions, LLC and U.S. Pat. No. 6,355,352 issued Mar. 12, 2002 to Jiann H. Chen, et al. (Chen '352). Both these references are hereby incorporated in their entirety by reference.

It is also known that various fluoropolymers, such as thermoplastic fluorocarbon polymers and random copolymers are useful as coatings on such rollers as release surfaces. Some such fluorocarbon thermoplastic polymers and thermoplastic random copolymers, including various additive materials, are disclosed in U.S. Pat. No. 6,372,833 issued Apr. 16, 2002 to Jiann H. Chen, et al. (Chen '833) and assigned on its face to NexPress Solutions LLC, and U.S. Pat. No. 6,429,249 issued Aug. 6, 2002 to Jiann H. Chen, et al. (Chen '249) and assigned on its face to NexPress Solutions, LLC. These patents are hereby incorporated in their entirety by reference.

While silicone rubbers and silcone polymers have been used widely as cushion layers, they have also in some instances been used as an exterior layer. Fluoroelastomers and rubbers, such as rubbers made of ethylene propylene diene monomers and the like have also been used as cushion layer materials. Unfortunately in many fusing processes the exterior of the fuser roller in direct contact with the toner, particularly a heated fuser roller, is coated with a release oil during fusing. Such release oils are generally detrimental to silicone rubbers and silicone polymers. Polyfluorocarbon polymers and random copolymers coated over the outside of the cushion layer have been found to be resistant to such oils and provide a low energy surface which readily releases from the toner and the receiver and are not adversely effected by the commonly used oils.

Notwithstanding the use of such materials for the production of rollers, it has been found in many instances the sheet and toner still tend to adhere to the fuser roller as the receiver sheet passes through and from the fusing nip. This creates a serious problem when the retention of the sheet is so serious as to result in wrapping the sheet around the roller and the like. Problems can also result when the release problems are less severe and the sheet does not release until forced to release by an air knife or the like. Such handling problems pose serious difficulties in routine operation of electrophotographic copying equipment. While various of the materials discussed above have been used in such applications, a need still exists for an improved process wherein improved releaseability of the receiver sheet and toner from the fuser roller as the sheet leaves the fusing nip is achieved. Continuing efforts have been directed toward the selection and the development of rollers that will meet this need and the development of improved release materials for use as external coatings for the pressure and fuser rollers.

SUMMARY OF THE INVENTION

According to the present invention, it has now been found that improved release of the receiver sheet and toner from the rollers is achieved in a fusing station for fusing a toner image to a receiver, wherein the fusing station includes: a fuser roller having a hardness from about 50 to about 80 Shore A, an outer diameter and an outside coating having a low damping fluorocarbon thermoplastic random copolymer roller coating formulation, the formulation having a tan delta from about 0.01 to about 0.15. The formulation includes a fluorocarbon thermoplastic random copolymer containing from about 5 to about 20 parts per hundred, based upon the weight of the copolymer of an aminosiloxane and from about 1.5 to about 2.5 parts per hundred based upon the weight of the copolymer of a curing agent having a bisphenol residue. The fusing station also includes a pressure roller having a smaller outer diameter than the outer diameter of the fuser roller and positioned in pressure contact with the fuser roller to form a fusing nip between the pressure roller and the fuser roller having a width from about 18 to about 22 millimeters, the pressure roller having a hardness from about 25 to about 33 Shore A and having an outside coating with the copolymer formulation.

It has further been found that improved release of a receiver sheet from a fuser roller is achieved by a method for fusing a toner image to a receiver with a reduced tendency of the receiver to stick to the fuser roller and increased reliability of operation, the method including the steps of: positioning a fuser roller having an outer diameter hardness from about 50 to about 80 Shore A and having an outside coating including a low damping fluorocarbon thermoplastic random copolymer fuser roller coating formulation, the formulation having a tan delta from about 0.01 to about 0.15 and including: a fluorocarbon thermoplastic random copolymer containing from about 5 to about 20 parts per hundred, based upon the weight of the copolymer of an aminosiloxane and from about 1.5 to about 2.5 parts per hundred based upon the weight of the copolymer of a curing agent having a bisphenol residue; positioning a pressure roller having an outer diameter smaller than an outer diameter of the fuser roller, having a hardness from about 25 to about 33 Shore A and having an outside coating of the copolymer formulation in pressure contact with the fuser roller to form a fusing nip between the fuser roller and the pressure roller; and, rotating the fuser roller and the pressure roller to move the surfaces of the rollers in a direction orthogonal to longitudinal axes of the rollers to move receiver sheets between the fuser roller and the pressure roller.

DESCRIPTION OF PREFERRED EMBODIMENTS

Figure 1:
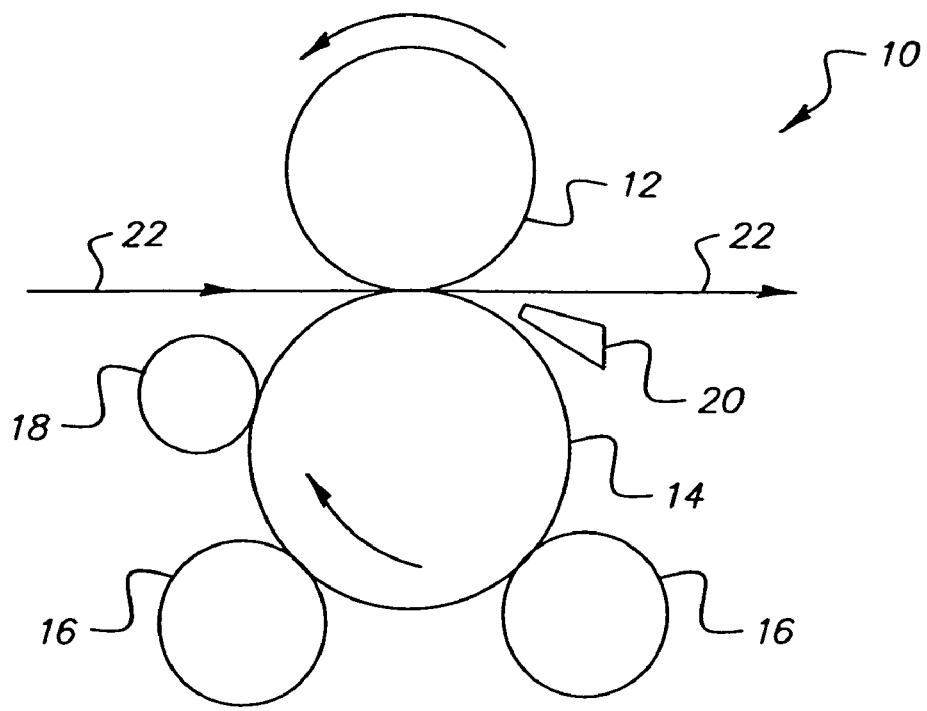
FIG. 1 discloses a schematic diagram of an embodiment of the present invention.

According to the present invention, a fusing station for fusing a toner image to a receiver with improved toner and receiver release from the fuser roller is disclosed. The fusing station includes: a fuser roller having a hardness from about 50 to about 80 Shore A, an outer diameter, and an outside coating including a low damping fluorocarbon thermoplastic random copolymer roller coating formulation, the formulation having a tan delta from about 0.01 to about 0.15 and including: a fluorocarbon thermoplastic random copolymer containing from about 5 to about 20 parts per hundred, based upon the weight of the copolymer of an aminosiloxane and from about 1.5 to about 2.5 parts per hundred based upon the weight of the copolymer of a curing agent having a bisphenol residue; and, a pressure roller having a smaller outer diameter than the outer diameter of the fuser roller and positioned in pressure contact with the fuser roller to form a fusing nip between the pressure roller and the fuser roller having a width from about 18 to about 22 millimeters, the pressure roller having a hardness from about 25 to about 33 Shore A and having an outside coating including the copolymer formulation.

The fusing station of claim 1 includes rollers that are maintained in pressure engagement and it will be understood that either the fuser roller or the heater roller could be mechanically rotatably driven with the other roller being driven by contact with the mechanically rotated roller.

Desirably, the fuser roller has a hardness from about 50 to about 80 Shore A as measured by ASTM D-2240. The fuser roller also has an outside coating including the materials described above as the copolymer formulation. Typically, this coating is formed on a roller which includes a metal core of a selected size and has a cushion material positioned around its outside surface with the copolymer coating formulation being positioned over the cushion layer with the copolymer formulation being cured in place.

The cushion layer may be any of the materials described above in the patents incorporated previously by reference or the like. The selection of the particular cushion material used and the thickness of the particular cushion material used are selected depending upon the desired hardness of the fuser roller or pressure roller. In the present invention, it is desirable that the fuser roller in addition to the properties set forth above, also include a cushion layer that is varied to result in a fuser roller having the desired hardness. Typically the fuser roller cushion layer is from about 0.050 to about 0.300 inches thick with the cushion layer being coated with a cured layer of the copolymer formulation from about 0.0015 to about 0.003 inches in thickness.

The production of such rollers is considered to be well known to those skilled in the art. Typically, the cushion material is positioned around the exterior of the core by any suitable method and thereafter ground or otherwise configured to a desired shape and thickness. The copolymer formulation is typically dissolved in a suitable solvent and may be applied to the exterior of the cushion layer by spraying, dipping or the like, as well known to the art. The thickness of the copolymer formulation on the roller is determined by variations of the viscosity, spraying time or other conditions as well known to provide a copolymer formulation layer having the desired thickness. According to the present invention, it is desirable that the fusing roller has a diameter somewhat larger than the pressure roller.

The pressure roller is formed in the same way as the fuser roller except that with the pressure roller the desired hardness is from about 25 to about 35 Shore A with the cushion layer having a thickness from about 0.100 to about 0.300 inches. Preferably, the cushion thickness is from about 0.180 to about 0.220 inches.

The fuser roller typically includes the heating system. The core may be of a wide variety of materials such as aluminum or other metal, elastomers, plastic and the like. The cushion material may be formed from any suitable silicone rubber, silicone polymer, fluorocarbon polymer or copolymer, fluoroelastomer or the like. Various such materials are disclosed in Chen '249, previously incorporated by reference.

Such materials and others known for this purpose are considered to be well known to those skilled in the art and no novelty is claimed in the particular cushion material selected. Preferably, the base cushion material selected is a silicone resin or a silicone rubber. The material is used in a thickness sufficient to provide the desired Shore A hardness.

Positioned over the base cushion is an elastomer that can include any suitable low surface energy material suitable for the release of the toner images so that the toner images are not removed to any substantial extent from the receiver by the fuser roller.

Thermoplastic fluorocarbon polymers and copolymers are preferred as the release layer over the cushion material. Suitable thicknesses for the copolymer formulation over the cushion material have been discussed above.

Such materials are well known to those skilled in the art and have been disclosed in Chen '352 and Chen '249. Desirably, such materials may contain other added materials such as aminosiloxanes, metal oxides and gloss controlling agents such as fluoroethylenepropylene.

The aminosiloxane is preferably a curable amino functional poly dimethylsiloxane copolymer, which is readily cured concurrently with the fluorocarbon thermoplastic copolymer to produce the coating suitable for use as the toner release layer of a fusing member. Preferred curable amino functionally poly dimethylsiloxanes include materials such as (aminoethylaminepropyl) methyl, (aminopropyl) methyl, and (aminopropyl) dimethyl. Such materials are well known to the art. Preferred metal oxides are materials such as zinc oxide. Both the cushion layer and the copolymer formulation may contain metal oxides.

A gloss-controlling agent, such as fluorinated ethylene propylene, may be used in the copolymer formulations; and if used, is typically present in quantities from 0 to about 45 percent.

It is important that the copolymer formulation includes from about 1.5 to about 2.5 parts per hundred, based upon the weight of the copolymer of a curing agent having a bisphenol residue.

The curing agent is desirably selected from the group consisting of a dihydroxy aromatic compound in combination with an organophosphonium salt in a ratio of about 4 parts of dihydroxy aromatic compound per part of organophosphonium salt. A preferred organophosphonium salt is benzitriphenyl phosphonium chloride.

The dihydroxy aromatic compound is selected from the group containing bisphenol A, bisphenol AF, hydroquinone and combinations thereof. These materials are considered to be well known by the generic names, but for clarity the chemical names for each of these materials are as follows: bisphenol A is hexafluoropropylidene diphenol; bisphenol AF is 4,4' isoprophylidene diphenol; and bisphenol S is 4,4'-sulfonyldiphenyl.

The ratio of dihydroxy aromatic compound/benzltriphenyl phosphonium chloride may vary from 1.5:1 to 9:1.

Desirably, the dihydroxy aromatic compound is bisphenol A, or bisphenol AF.

These materials are most readily available as a product marketed as CURE 50 curing agent. CURE 50 is a trademark of Dupont Dow Elastomer. This material is believed to be a mixture of bisphenol AF and benzltriphenyl phosphonium chloride in a ratio of 1 part bisphenol AF to 4 parts benzltriphenyl phosphonium chloride. While the other materials listed above are suitable, this material is readily available and is widely used as a curing agent.

The term "low damping" refers to the ratio of the viscous modulus to the elastic modulus. Desirably this ratio is at a value such that further changes no longer affect receiver release properties. Typically such values are less than about 0.15.

The formulation of the present invention provides a significant improvement over existing formulations of this type, which results in improved release properties when the formulations are used as an outer coating on rollers. As indicated previously, the term "rollers" is used to refer to both pressure rollers and heated fuser rollers as well as similar contact surfaces which may be formed by fuser belts and the like. Such surfaces benefit similarly in all instances from the use of this material as an exterior coating.

As noted previously, such rollers typically include cushion materials of a quantity designed to provide the desired cushioning to the fuser rollers. Typically, cushion materials commonly include silicone rubbers or silicone polymers and the like as known to the art and may be coated onto the exterior of the inner core of a fuser roller by any convenient method and thereafter cured and machined to a desired size and configuration.

The molecular weight of the uncured copolymer is largely a matter of convenience, although an excessively large or excessively small molecular weight could create problems, as known to those skilled in the art. Typically, the copolymer has a number average molecular weight in the range from about 100,000 to about 200,000.

In the preparation of the formulations of the present invention, the fluorocarbon thermoplastic copolymer, aminosiloxane and curing agent, plus any other desired additives are mixed and subsequently are cured by heating to a selected temperature which is typically from about 260° C. to about 270° C., for a time from about 0.5 to about 3 hours.

In the use of the formulations of the present invention, typically the copolymer, aminosiloxane and curing agent are mixed with a suitable solvent such as methylethylketone in a mill or as otherwise as known to those skilled in the art. A variety of suitable solvents for this purpose are well known. After mixing, the materials are readily coated onto the exterior of the cushion layer around the core of the fuser roller by spraying, dipping or the like, as known to the art. Thereafter they are heated to a desired temperature for a suitable time to cure the formulation.

The cured formulation will be found to have a tan delta of from about 0.01 to about 0.15, and preferably from about 0.1 to about 0.12. This formulation provides outer coatings for fuser rollers, which more readily release the receiver sheets from the nip so that good receiver sheet flow is achieved through the fusing station. The improved release properties reduce the tendency for paper wrapping to occur.

While curing agents have been used in the past, it is has not been appreciated in the past that a very narrow range of curing agent concentration provides surprisingly superior results. For instance, it has been found that at concentrations below about 1 part per hundred based on the weight of the copolymer of curing agent the improved release distances are not achieved. Further, it has been found that at concentrations above about 2.5 parts per hundred, based on the weight of the copolymer, that gelation begins to occur quite rapidly to the detriment of additional coating activities using the solution of the formulation and to the quality and quantity of the resulting coating on the exterior of the coated fuser roller.

Desirably, the tangent (tan) delta of the cured copolymer formulation is from about 0.01 to 0.15, and preferably from about 0.01 to about 0.12. As well known, the tan delta value is determined by dividing the loss modulus by the elastic modulus for the particular material. This value has been found to be indicative of the ability of the material to disengage receiver sheets from the fuser roller very efficiently and dependably.

The term low damping as used herein refers to the ratio of the viscous modulus to the elastic modulus. Desirably this ratio is at a value such that further changes no longer affect receiver release properties. Typically such values are less than about 0.15.

By the combination of features disclosed above, improved release of the receiver sheets from the fuser roller is achieved. Desirably, the fuser roller is somewhat larger than the pressure roller. For instance, desirable results have been achieved when the fuser roller has an outer diameter of about 6 inches with the pressure roller having an outer diameter of about 3.5 inches. Considerable variation is possible within the scope of the present invention, but it is desirable that the fuser roller have a slightly larger outer diameter than the pressure roller.

It is also desirable that the rollers be operated at a pressure such that the nip formed between the two rollers is from about 18 to about 22 millimeters (mm).

In FIG. 1, a schematic diagram of an embodiment of the present invention is shown. In this embodiment, a fusing station 10 is shown. The fusing station includes a pressure roller 12 having an outer diameter 13 and a fuser roller 14 having an outer diameter 15. Each of the rollers has a longitudinal axis centrally positioned through the roller orthogonally to the direction of rotation of the roller. Heater rollers 16 are provided to externally heat fuser roller 14. A wick roller 18 is shown to supply oil to the outer surface of fuser roller 14 to improve the release of receiver sheets from fuser roller 14. A paper path 22 is shown and will be understood to include a plurality of components necessary to relay the paper to and through and recover it from the fusing nip. The fusing nip, while not numbered, constitutes the space between pressure roller 12 and fuser roller 14 in which the rollers are in engagement. This will vary as a function of the hardness of the rollers and the pressure applied to the rollers. An air knife 20 is shown, which directs air to the surface of fuser roller 14 as the receiver sheets are discharged to facilitate the recovery of the receiver sheets without retention on the surface of fuser roller 14.

Figure 2:
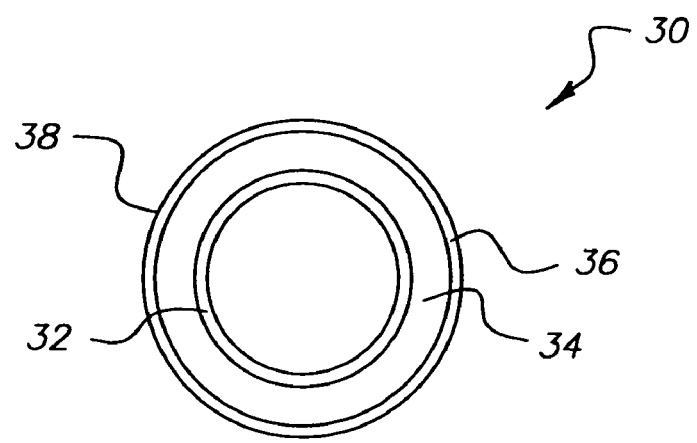
FIG. 2 is a cross-sectional view of a roller, which may be a pressure roller or a fuser roller according to the present invention.

In FIG. 2, a roller 30 is shown and includes a metal core 32, a cushion layer 34 which is positioned around metal core 32, and a release layer 36 positioned around cushion layer 34 to form a surface 38 on roller 30, which has a low surface energy and is adapted to the ready release of receiver sheets from the surface of roller 30. Generally, the same construction is used for both the pressure roller and fuser roller of the present invention but less or no cushion material may be used with the fuser roller.

Figure 3:
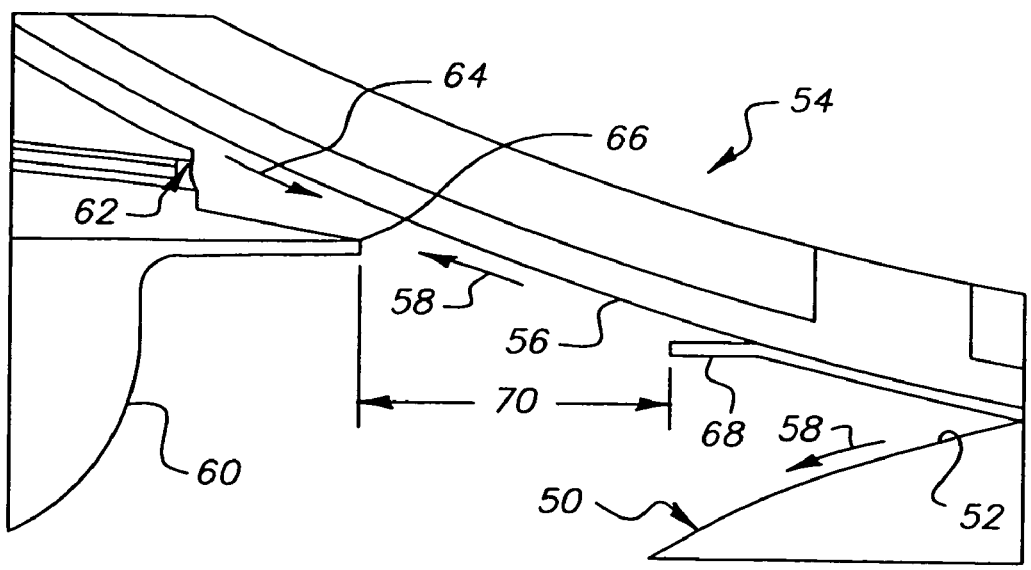
FIG. 3 is a schematic diagram of the release area of the receiver sheet from a fuser roller in a prior art fusing station.

In FIG. 3, a schematic diagram of a pressure roller 50 having a surface 52 is shown. A fuser roller 54 having a surface 56 is also shown in contact with pressure roller 50. These rollers rotate in a direction shown by arrows 58 and an air knife 60 is shown as positioned with an air knife nozzle 62 positioned to discharge air in a direction shown by arrow 64 to assist in the disengagement of receiver sheets from the fuser roller.

A property frequently used to define the quality of the release of the receiver sheets from the fuser roller is referred to as the release distance, which is shown by arrows 70. The release distance is defined as the distance between the end of a page 68 where it releases from fuser roller 54 and a leading edge 66 of the air knife. This distance is referred to as the release distance and is desirably as large as possible.

The combination of the copolymer coating formulation with the properties of the fuser roller and pressure roller as described herein have resulted in a fusing station which not only effectively fuses the toner images to the receiver sheets, but also provides much improved receiver sheet release from the toner and the fuser roller as it leaves the nip. This is a significant improvement is an area of considerable concern to those skilled in the art and represents a significant advancement in the art.

The following examples illustrate various features of the present invention.

EXAMPLE 1

The composition shown in Table 1 was varied by changing the amount of CURE 50 curing agent added to the composition. The varied compositions were then used to coat a fuser roller and receiver sheets bearing toner images which were then fused using the fuser roller in a fuser system.

TABLE 1

(Cured fluorocarbon thermoplastic random copolymer composition)

| Composition | Amount/pph-Based Upon The Copolymer |
|---|---|
| Fluorocarbon thermoplastic random copolymer | 100 |
| Aminosiloxane | 10 |
| Zinc oxide | 7.44 |
| CURE 50 curing agent | 2 |
| Gloss controlling agent FEP (Fluroethylpropylene) | 10 |

The test results are shown below in Table 2.

TABLE 2

EXAMPLES 1–4 AND COMPARATIVE EXAMPLES 5–7

| Tests | Amount of CURE 50 pph | Release distance mm |
|---|---|---|
| 1 | 2 | 14 |
| 2 | 2 | 14 |
| 3 | 1.5 | 10 |
| 4 | 1.5 | 10 |
| Comparative 5 | 1.0 | 6 |
| Comparative 6 | 1.0 | 4 |
| Comparative 7 | 1.0 | 2 |

The use of quantities of CURE 50 curing agent of at least 1.5 parts per hundred has resulted in much greater release distances.

EXAMPLE 2

Figure 4:
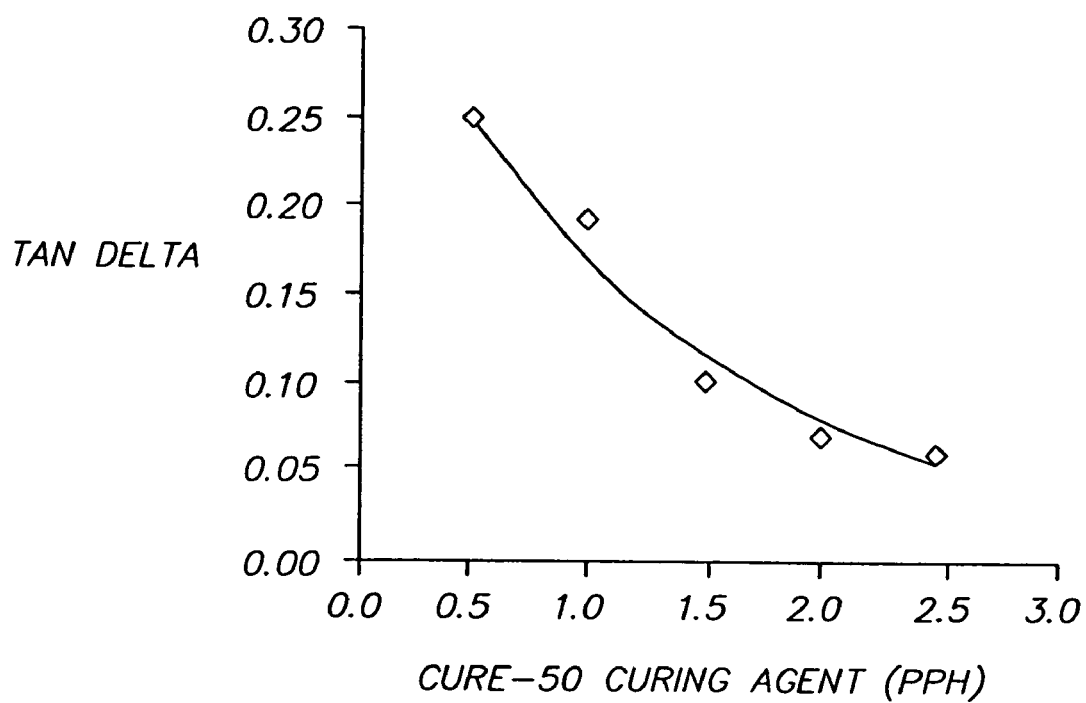
FIG. 4 is a graph showing the test results from Example 2.

In copolymer formulations produced by varying the CURE 50 curing agent quantities present in the compositions of Table 1, the tan delta at 200° C. of the varied compositions was determined. The release data shown indicates the tan delta requirements for good release. This data is shown schematically in FIG. 4 and demonstrates that the tan delta value is affected by the amount of CURE 50 curing agent used. The tan delta should desirably be between 0.01 and 0.15, which roughly corresponds to slightly less than 1.5 parts per hundred of CURE 50 curing agent. This graph strikingly shows the effect achieved on the tan delta as a function of the amount of CURE 50 curing agent.

EXAMPLE 3

Figure 5:
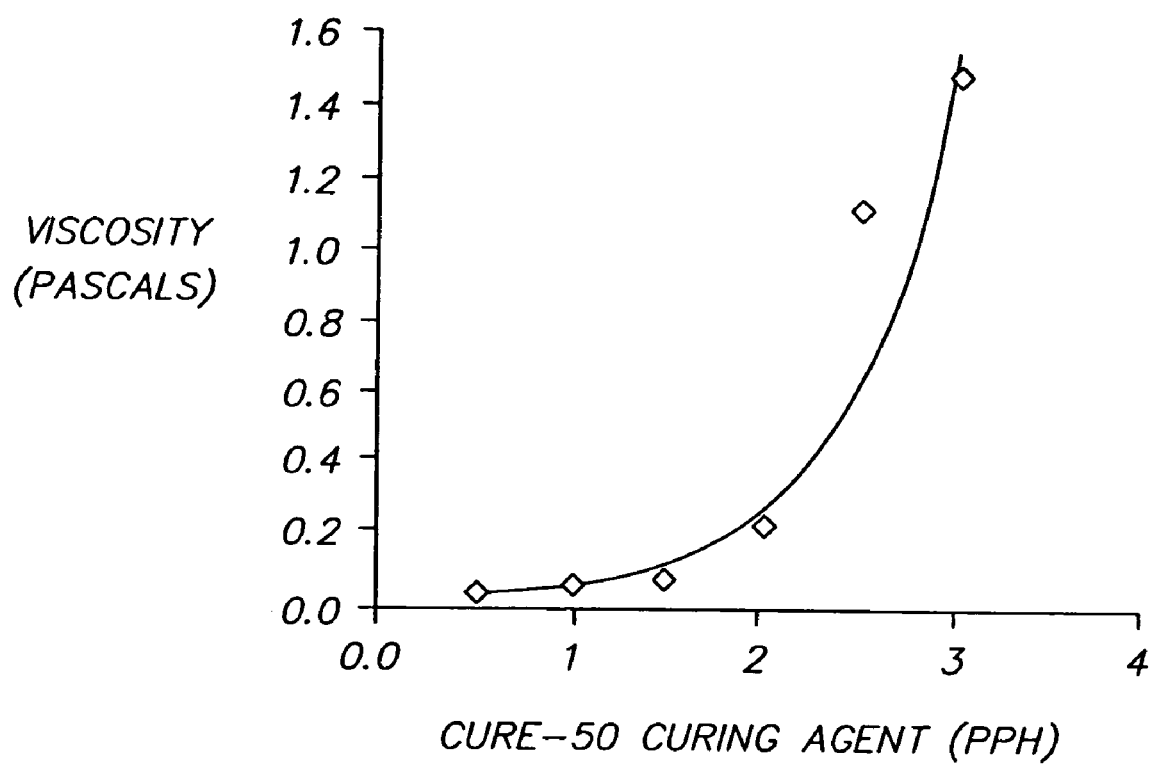
FIG. 5 is a graph showing the results of the test shown in Example 3.

In Example 3, increased quantities of CURE 50 curing agent were used in a copolymer formulation. The copolymer formulation was then dissolved in a suitable solvent, which was methyl ethyl ketone. It was observed that with increased quantities of CURE 50 curing agent, the viscosity of the resulting solution increased rapidly with additional quantities of CURE 50 curing agent over about 2.5 parts per hundred. This increase in viscosity increases the difficulty of applying the formulation to the outside of a roller and demonstrates the increased tendency of the resulting solution to gel rapidly. This rapid gelling and rapid curing can result in a less durable and less desirable exterior coating on the rollers. The test results are shown in FIG. 5.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A fusing station for fusing a toner image to a receiver, the fusing station comprising:
   a) a fuser roller having a hardness from about 50 to about 80 Shore A, an outer diameter, and an outside coating comprising a low damping fluorocarbon thermoplastic random copolymer fuser roller coating formulation, the formulation having a tan delta from about 0.01 to about 0.15 and comprising: a fluorocarbon thermoplastic random copolymer containing from about 5 to about 20 parts per hundred, based upon the weight of the copolymer of an aminosiloxane and from about 1.5 to about 2.5 parts per hundred based upon the weight of the copolymer of a curing agent having a bisphenol residue; and
   b) a pressure roller having a smaller outer diameter than the outer diameter of the fuser roller and positioned in pressure contact with the fuser roller to form a fusing nip between the pressure roller and the fuser roller having a width from about 18 to about 22 millimeters, the pressure roller having a hardness from about 25 to about 33 Shore A and having an outside coating comprising the copolymer formulation.

2. The fusing station of claim 1 wherein the fuser roller includes a heating element inside the fuser roller.

3. The fusing station of claim 1 wherein the fuser roller is heated by at least one heater roller.

4. The fusing station of claim 1 wherein the fuser roller comprises a metal core coated with a cushion layer from about 0.050 to about 0.300 inches thick with the cushion layer being coated with a cured layer of the copolymer formulation from about 0.0015 to about 0.003 inches thick.

5. The fusing station of claim 1 wherein the pressure roller comprises a metal core coated with a cushion layer from about 0.100 to about 0.300 inches thick with the cushion layer being coated with a cured layer of the copolymer formulation from about 0.0015 to about 0.003 inches thick.

6. The fusing station of claim 1 wherein the curing agent contains an organophosphonium salt and a dihydroxy aromatic compound.

7. The fusing station of claim 6 wherein the organophosphonium salt is benzyltriphenylphosphonium chloride.

8. The fusing station of claim 7 wherein the benzltriphenyl phosphonium chloride and the dihydroxy aromatic compounds are present in a ratio of about 1 part benzltriphenyl phosphonium chloride per 1.5 to 9 parts of dihydroxy aromatic compound.

9. The fusing station of claim 2 wherein the dihydroxy aromatic compound is selected from the group consisting of bisphenol A, bisphenol AF, bisphenol S and combinations thereof.

10. The fusing station of claim 6 wherein the tan delta is from about 0.01 to about 0.12.

11. The fusing station of claim 1 wherein the copolymer formulation contains up to about 45 parts per hundred based upon the weight of the copolymer of fluorinated ethylene propylene.

12. The fusing station of claim 1 wherein the aminosiloxane is an amino functional polydimethylsiloxane copolymer selected from the group consisting of (aminoethylaminopropyl) methyl, (aminopropyl)methyl, (aminopropyl) dimethyl and mixtures thereof.

13. The fusing station of claim 1 wherein the fuser roller comprises a 6 inch outer diameter aluminum core coated with a thermally insulating layer of a cushion layer comprising an insulating rubber about 0.125 inches thick with a cured coating of the copolymer formulation about 0.0025 inches thick over the insulating rubber layer.

14. The fusing station of claim 1 wherein the pressure roller comprises a 3.5-inch outer diameter aluminum core coated with a 0.200 thick thermally insulating layer of a rubber overcoated with a layer of the cured polymer formulation about 0.0025 inches thick.

15. A method for fusing a toner image to a receiver with a reduced tendency of the receiver to stick to a fuser roller and increased reliability of operation, the method comprising:
   a) positioning a fuser roller having a hardness from about 50 to about 80 Shore A, an outer diameter, an outer surface, a longitudinal axis on its outer surface, and an outside coating comprising a low damping fluorocarbon thermoplastic random copolymer roller coating formulation, the formulation having a tan delta from about 0.01 to about 0.15 and comprising: a fluorocarbon thermoplastic random copolymer containing from about 5 to about 20 parts per hundred, based upon the weight of the copolymer of an aminosiloxane and from about 1.5 to about 2.5 parts per hundred based upon the weight of the copolymer of a curing agent having a bisphenol residue;

b) positioning a pressure roller having an outer diameter smaller than the outer diameter of a fuser roller a hardness from about 25 to about 33 Shore A, an outer surface, a longitudinal axis, having an outside coating of the copolymer formulation on its outer surface and in pressure contact with the fuser roller to form a fusing nip between the fuser roller and the pressure roller; and c) rotating the fuser roller and the pressure roller to move the outer surfaces of the rollers in a direction orthogonal to longitudinal axes of the rollers to move receiver sheets between the fuser roller and the pressure roller.

16. The method of claim 15 wherein at least one of the fuser roller and the pressure roller is heated.

17. The method of claim 15 wherein one of the rollers is rotationally driven and wherein the driven roller rotates the other roller.

18. The method of claim 15 wherein the driven roller is the fuser roller.

19. The method of claim 15 wherein the fuser roller is heated.

* * * * *